US012768753B2

(12) United States Patent
Grimm

(10) Patent No.: US 12,768,753 B2
(45) Date of Patent: Oct. 20, 2026

(54) FILTRATION MODULE AND ASSEMBLY FOR FILTERING A PROCESS MEDIUM IN A BIOPROCESS AND METHOD OF SAMPLING DURING A BIOPROCESS

(71) Applicant: Sartorius Stedim Biotech GmbH, Goettingen (DE)

(72) Inventor: Christian Grimm, Goettingen (DE)

(73) Assignee: Sartorius Stedim Biotech GmbH, Goettingen (DE)

( * ) Notice: Subject to any disclaimer, the term of this patent is extended or adjusted under 35 U.S.C. 154(b) by 1064 days.

(21) Appl. No.: 17/792,449

(22) PCT Filed: Jan. 11, 2021

(86) PCT No.: PCT/EP2021/050395
§ 371 (c)(1),
(2) Date: Jul. 13, 2022

(87) PCT Pub. No.: WO2021/144227
PCT Pub. Date: Jul. 22, 2021

(65) Prior Publication Data

US 2023/0117524 A1 Apr. 20, 2023

(30) Foreign Application Priority Data

Jan. 16, 2020 (EP) .................................... 20152273

(51) Int. Cl.
*G01N 1/20* (2006.01)
*B01D 63/02* (2006.01)
(Continued)

(52) U.S. Cl.
CPC ........... *G01N 1/2035* (2013.01); *B01D 63/02* (2013.01); *B01D 63/08* (2013.01); *B01D 69/02* (2013.01);
(Continued)

(58) Field of Classification Search
CPC ......... G01N 1/2035; G01N 2001/4016; B01D 63/02; B01D 63/08; B01D 69/02;
(Continued)

(56) References Cited

U.S. PATENT DOCUMENTS 8,876,732 B2 11/2014 Kuennecke et al.
10,022,081 B2 7/2018 Kuennecke et al.
(Continued)

FOREIGN PATENT DOCUMENTS

DE 3441249 A1 5/1985
DE 102009001455 A1 * 9/2010 ........... B01D 61/243
(Continued)

OTHER PUBLICATIONS

International Search Report issued in International Application No. PCT/EP2021/050395, issued May 26, 2021, 3 pages.

*Primary Examiner* — Charles Capozzi
*Assistant Examiner* — Alex Ramirez
(74) *Attorney, Agent, or Firm* — Dilworth IP, LLC

(57) ABSTRACT

A filtration module for filtering a process medium in a bioprocess including a process flow path for a process medium, a filter membrane coupled to the process flow path, and a sampling membrane coupled both to the process flow path and to a sampling flow path for extracting a sample from the process medium. The sampling flow path guides the extracted sample to a sampling outlet of the filtration module or to an analyzer integrated into the filtration module. A filtration assembly including the filtration module and an analyzer coupled to the sampling outlet of the filtration module. A method of sampling during a bioprocess including providing such a filtration module, urging a process medium through the process flow path, filtering the process medium by using the filter membrane, extracting a sample
(Continued)

from the process medium by using the sampling membrane, and guiding the extracted sample to a sampling outlet.

17 Claims, 3 Drawing Sheets

(51) Int. Cl.
*B01D 63/08* (2006.01)
*B01D 69/02* (2006.01)
*G01N 1/40* (2006.01)

(52) U.S. Cl.
CPC .... *B01D 2313/08* (2013.01); *B01D 2313/701* (2022.08); *B01D 2313/903* (2022.08); *B01D 2319/06* (2013.01); *B01D 2325/36* (2013.01); *B01D 2325/38* (2013.01); *G01N 2001/4016* (2013.01)

(58) Field of Classification Search
CPC .......... B01D 2313/90; B01D 2313/701; B01D 2313/08; B01D 2319/06; B01D 2325/36; B01D 2325/38
See application file for complete search history.

(56) References Cited

U.S. PATENT DOCUMENTS

| | | | | |
|---|---|---|---|---|
| 2010/0113975 | A1 | 5/2010 | Kuennecke et al. | |
| 2010/0224545 | A1* | 9/2010 | Rolchigo | C02F 3/1268<br>210/151 |
| 2012/0071788 | A1* | 3/2012 | Kunnecke | A61B 5/14525<br>600/573 |
| 2018/0243693 | A1 | 8/2018 | Benton et al. | |
| 2020/0291344 | A1 | 9/2020 | Grimm et al. | |

FOREIGN PATENT DOCUMENTS

| | | | |
|---|---|---|---|
| DE | 202018000467 | U1 | 2/2018 |
| DE | 102017011263 | B3 | 5/2019 |
| EP | 1922987 | A1 | 5/2008 |
| EP | 2091412 | B1 | 3/2014 |
| EP | 3593895 | A1 | 1/2020 |
| WO | 9217762 | A1 | 10/1992 |
| WO | 2019110185 | A1 | 6/2019 |

* cited by examiner

C - C
22
16
22

A
24
A

26
B
C
C
24
B

B - B
18
16
26
X
24

Detail X
28
16
18

A - A
22
18
16
26
17
19
22
24

20
26
24

B - B
In
Out
24
26
22
22
18
16
Detail X 22
22
18
16
30

B
B
A - A
X 22
16
22

A
A
24
26

20
18
16
24
26

FILTRATION MODULE AND ASSEMBLY FOR FILTERING A PROCESS MEDIUM IN A BIOPROCESS AND METHOD OF SAMPLING DURING A BIOPROCESS

FIELD OF THE INVENTION

The invention relates to a filtration module for filtering a process medium in a bioprocess, in particular in a biopharmaceutical process. The invention further relates to a filtration assembly comprising such a filtration module. The invention also relates to a method of sampling during a bioprocess, in particular in a biopharmaceutical process.

BACKGROUND

Biopharmaceutical processes typically include basic process steps such as cell separation (e.g. by depth filtration), sterile filtration, chromatography (column chromatography, membrane chromatography with single-use capsules or cartridges, flow-through chromatography), virus inactivation, virus filtration, crossflow filtration etc. These process steps represent unit operations that can be interconnected in various ways to form different overall processes.

With regard to filtration processes, it is current practice to connect different filter devices or filter assemblies, which are designed to accomplish different process steps, as shown in DE 34 41 249 A1 and DE 20 2018 000 467 U1, for example.

Furthermore, a dialysis probe for measuring nutrients and metabolites in a bioreactor is known from EP 2 091 412 B1, and a probe for measuring other parameters in a bioreactor, such as the concentration of an antibody, is known from WO 2019/110185 A1.

SUMMARY

It is an object of the invention to enable on-line or even in-line measurement of certain analytes or parameters during a running process step or even during a sub-step of a bioprocess.

The above problem is solved by a filtration module according to claim 1. Advantageous and expedient embodiments of the invention are apparent from the dependent claims.

The invention provides a filtration module for filtering a process medium in a bioprocess, in particular in a biopharmaceutical process. The filtration module according to the invention comprises a process flow path for a process medium, a filter membrane coupled to the process flow path, and a sampling membrane coupled both to the process flow path and to a sampling flow path for extracting a sample from the process medium. The sampling flow path guides the extracted sample to a sampling outlet of the filtration module or to an analyzer integrated into the filtration module.

Regarding the overall design, the filtration module according to the invention can be configured as a cartridge, a cassette, a capsule, a membrane adsorber or the like. Such modules are usually prefabricated or preassembled units which already include necessary connectors (e.g. tri-clamp or hose barb) for connection to input and output lines.

In the filtration module according to the invention, the process flow path is the main path of the process medium in the module, whereas the sampling flow path is an additional path provided for the sample extracted from the process medium. Both membranes, i.e. the filter membrane and the sampling membrane are coupled to the process flow path.

"Coupled to the process flow path" and "coupled to the sampling flow path" means that the membranes are in direct fluid communication with the process flow path and the process flow path, respectively.

While the filter membrane is used for the actual filtering of the process medium, the sampling membrane is used at the same time to extract a sample from the process medium, i.e. while the process medium flows through the process flow path during the filtering process (sub-) step. Since the sampling membrane is coupled to the sampling flow path, the sample passes through the sampling membrane into the sampling flow path, where it is guided either to an internal analyzer within the filtration module or to an external analyzer.

The type of membrane which is used as sampling membrane is chosen according to the analyte(s) and/or parameter(s) to be analyzed. If a specific analyte is to be extracted, especially the molecular weight cut-off (MWCO) of the sampling membrane is chosen accordingly. Using a sampling membrane adapted to the specific analyte is especially advantageous because other components of the process medium are held back and thus cannot disturb the analysis. In particular, sampling with such a specific membrane does not result in a loss of the target protein, which remains in the process flow path.

Possible analytes are, for example, antibodies, therapeutic protein, host cell protein (HCP), DNA, salt concentration, protein A etc.

The sampling membrane can be a dialysis membrane, i.e. a semi-permeable film (usually a sheet of regenerated cellulose) containing a plurality of pores of predefined size. It is thus possible to separate molecules in solution by the difference in their rates of diffusion through the semi-permeable membrane. The shape of the sampling membrane can be adapted as expedient, e.g. flat, curved, cylindrical etc.

Depending on the characteristics of the sampling membrane (pore size etc.), it may be necessary or at least expedient to transport the sample to the analyzer with a transportation medium (typically a buffer) which is urged through the sampling flow path.

With the filtration module according to the invention it is possible to automatically extract multiple samples or to provide quasi-continuous sampling during the process without the risk of contamination. The samples can be analyzed automatically in real-time. Thus, the results of the analysis can be immediately used to adjust or control the running process via a process control unit connected to the analyzer.

Preferably, the sampling membrane forms at least a portion of a boundary between the process medium and the sampling flow path. This allows a direct transfer into the sampling flow path without any obstacles.

A major advantage of the invention is that the filtration process does not have to be interrupted when samples are taken. Moreover, during sampling even a pressure loss in the process flow path can largely be avoided since only selected molecules are extracted from the process medium, especially in an embodiment with a sampling membrane having a pore size (MWCO) which is significantly smaller than the pore size of the filter membrane used for the actual filtration step performed in the filtration module.

However, the sampling membrane can also be a regular filter membrane. Compared to the filter membrane used for the actual filtration step, the sampling membrane can still have other characteristics. Nevertheless it will allow enough of the process medium components to pass through into the sampling flow path so that in this case a transport medium is not absolutely necessary.

In order to extract different analytes from the process medium it is expedient to provide at least one further sampling membrane which is coupled both to the process flow path and to the sampling flow path, the sampling membranes having different characteristics, especially different pore sizes.

According to a first aspect of the above approach, the individual sampling membranes are coupled to different sampling channels of the sampling flow path. This means that the sampling flow path includes separate channels where different analytes are transported. The advantage of this design is that the different analytes are prevented from being mixed with each other.

According to a second aspect, which may be combined with the first aspect mentioned before, the individual sampling membranes are coupled to different process channels of the process flow path. This means that the process flow path is divided into separate channels, and the different samples are taken from the different process channels.

According to a specific embodiment of the invention, the sampling membrane can be a hollow fiber arranged as a channel in the process flow path.

It is also possible to use a capture membrane as sampling membrane. With a capture membrane an analyte can be enriched before it is transported to the analyzer.

The sampling membrane can also be a hydrophilic membrane or a hydrophobic membrane (depending on the analyte). In this case, hydrophilic or hydrophobic characteristics of the analyte can be used to separate it from the process medium.

The analyzer can be provided inside the filtration module. If the filtration module is designed as a single-use module, this means that the analyzer is at least partly made of single-use components. It is to be noted that further components may be needed for a full analysis which are provided outside the filtration module. Such outside components, which are usually reusable components, are not regarded as components of the "integrated" analyzer here.

Depending on the analyte and/or the parameter(s) of the process medium sample to be analyzed, the integrated analyzer can be based on at least one of the following techniques: liquid chromatography (LC); liquid chromatography-mass spectrometry (LC-MS); high-performance liquid chromatography (HPLC); ultra-high-performance liquid chromatography (UHPLC); gas chromatography (GC); gas chromatography-mass spectrometry (GC-MS); matrix-assisted laser desorption/ionization combined with time-of-flight mass spectrometry (MALDI-TOF); enzymatic analysis; spectroscopic analysis, in particular at least one of the following: Raman spectroscopy, near-infrared spectroscopy (NIR), mid-infrared spectroscopy (MIR), ultraviolet-visible spectroscopy (UV-Vis), fluorescence spectroscopy; osmometry; pH measurement; conductivity measurement; optical measurement, in particular refractometry; surface plasmon resonance (SPR); nuclear magnetic resonance spectroscopy (NMR).

The invention also provides a filtration assembly for filtering a process medium in a bioprocess, in particular in a biopharmaceutical process. The filtration assembly according to the invention comprises a filtration module as defined above and an analyzer coupled to the sampling outlet of the filtration module. This means that the analyzer is provided as an external apparatus. Since it is not integrated into the (single-use) filtration module, the external analyzer can be a more complex, reusable apparatus.

The external analyzer can be based on at least one of the following techniques: liquid chromatography (LC); liquid chromatography-mass spectrometry (LC-MS); high-performance liquid chromatography (HPLC); ultra-high-performance liquid chromatography (UHPLC); gas chromatography (GC); gas chromatography-mass spectrometry (GC-MS); matrix-assisted laser desorption/ionization combined with time-of-flight mass spectrometry (MALDI-TOF); enzymatic analysis; spectroscopic analysis, in particular at least one of the following: Raman spectroscopy, near-infrared spectroscopy (NIR), mid-infrared spectroscopy (MIR), ultraviolet-visible spectroscopy (UV-Vis), fluorescence spectroscopy; osmometry; pH measurement; conductivity measurement; optical measurement, in particular refractometry; surface plasmon resonance (SPR); nuclear magnetic resonance spectroscopy (NMR).

If a transport medium, in particular a buffer or a solvent, is used to receive the samples extracted from the process medium by the sampling membrane or to wash out an analyte from the sampling membrane, the filtration assembly preferably comprises means for urging the transport medium through the sampling flow path, e.g. a pump. It is most effective to use the sampling membrane in countercurrent mode, i.e. the process medium and the transport medium flow in opposite directions along opposite sides of the sampling membrane.

The filtration assembly may also comprise a process control unit which is configured to receive data from the analyzer and to adjust or to control process components of the bioprocess based on the results of the analysis. Such process components could be components used in the actual filtration step or other components used in other steps of the bioprocess.

In view of a specific application, the filtration module as defined above or the filtration assembly as defined above is used in a running filtration step of a bioprocess, in particular a biopharmaceutical process.

The invention further provides a method of sampling during a bioprocess, in particular during a biopharmaceutical process. The sampling method according to the invention comprises the following steps: providing a filtration module as defined above; urging a process medium through the process flow path; filtering the process medium by using the filter membrane coupled to the process flow path; extracting a sample from the process medium by using the sampling membrane coupled to both the process flow path and the sampling flow path; and guiding the extracted sample to a sampling outlet of the filtration module or to an analyzer integrated into the filtration module.

In order to receive and transport the samples extracted from the process medium a transport medium should be urged through the sampling flow path towards the analyzer.

As explained before, countercurrent flow operation of the process medium and the transport medium is most effective, i.e. it is preferred that the process medium and the transport medium flow in opposite directions along opposite sides of the sampling membrane.

According to a first alternative, the transport medium is continuously urged through the sampling flow path so that a quasi-continuous sample analysis is possible.

According to a second alternative, the transport medium is urged through the sampling flow path in a stopped-flow manner so that different samples can be analyzed separately.

In order to enable an immediate influence on the running bioprocess, the sampling method further comprises the following steps: analyzing the sample by the analyzer; and adjusting or controlling the bioprocess based on the results of the analysis. Corresponding adjustment or control actions may affect the current filtration step or any other step of the bioprocess.

Further, the invention provides a computer program comprising instructions to effect at least one of the following: cause the means for urging the transport medium through the sampling flow path of the filtration assembly to control the flow of the transport medium; control the analyzer of the filtration module or the analyzer of the filtration assembly, especially providing settings and inputs to the analyzer; cause a process control unit of the filtration assembly to evaluate analysis data provided by the analyzer of the filtration module or the analyzer of the filtration assembly, and to adjust or control the bioprocess based on the evaluation.

BRIEF DESCRIPTION OF THE DRAWINGS

Further features and advantages of the invention will become apparent from the following description and from the accompanying drawings to which reference is made. In the drawings.

DETAILED DESCRIPTION

Figure 1:
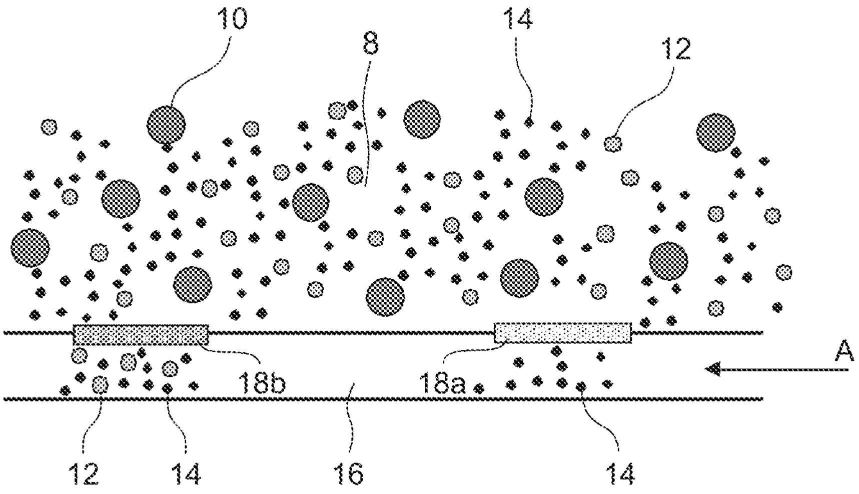
FIG. 1 schematically shows a sampling technique using two different sampling membranes arranged sequentially.

FIG. 1 schematically illustrates how samples can be taken from a process medium in a filtration module. The upper half of FIG. 1 shows a process flow path 8 including a process medium containing several components. By way of example, three different components of the process medium are represented by different symbols. In this example, large circles represent a plurality of cells 10, medium-sized circles represent a plurality of proteins and/or antibodies 12, and small dots represent a plurality of smaller molecules 14, e.g. glucose and/or lactate molecules.

A sampling flow path 16 is in direct contact with the process medium. With respect to a flow direction indicated by arrow A, two different sampling membranes 18*a*, 18*b* are sequentially arranged in the sampling flow path 16. In particular, each of the sampling membranes 18*a*, 18*b* forms a portion of the boundary between the process medium and the sampling flow path 16.

In the example shown, the first sampling membrane 18*a* has a smaller pore size (more specifically: a lower molecular weight cut-off (MWCO)) than the second sampling membrane 18*b*. Therefore, only the smaller molecules 14 can pass through the second membrane into the sampling flow path 16. A first diffusion time can be set, during which a transport medium, typically a buffer or a solvent, is not urged through the sampling flow path 16 in the transport direction A, but halted, to provide sufficient time for the smaller molecules to travel across the first sampling membrane 18*a* into the sampling flow path 16. The transport medium can then be urged a little further, e.g. up to the second sampling membrane 18*b*.

The second sampling membrane 18*b* has a larger cut-off pore size than the first sampling membrane 18*a*. Therefore, the medium sized components of the medium can diffuse through the second sampling membrane 18*b*, especially the proteins and/or antibodies 12. A second diffusion time can be set, during which the transport medium is halted to allow the medium sized molecules to enter into the sampling flow path 16. The transport medium can then be urged further to transport the sample with the molecules collected from the process medium to an analyzer 17.

The transport medium can be urged through the sampling flow path 16 by a drive, e.g. a pump, or by gravity. Halting of the transport medium can be effected by stopping the external drive or by other means, e.g. a valve. Alternatively, the transport medium is not halted but constantly urged through the sampling flow path 16 at constant velocity.

The sampling procedure shown schematically in FIG. 1 allows samples of two different components of the process medium to be taken and analyzed. For example, the concentration of the two components in the process medium can be determined.

FIGS. 2*a* to 2*f* show a first embodiment of a filtration module 20 for filtering a process medium in a bioprocess, in particular in a biopharmaceutical process. In practice, the filtration module 20 is used in a running filtration step of such a process.

The filtration module 20 is a prefabricated or preassembled unit designed as a cartridge, but could also be designed as a capsule or the like. The whole filtration module 20 is configured as a single-use module, i.e. it is made of materials that can be sterilized, especially by gamma radiation. Preferably, the filtration module 20 is sterilized before it is shipped as a ready-to-use module to a customer.

The filtration module 20 includes at least one process flow path. Via an inlet connector (not shown) the process medium to be filtered in the filtration module 20 is fed to one filter membrane or a stack of filter membranes 22 (not shown in detail) arranged in the process flow path. Via a corresponding output connector (not shown) the filtered process medium exits the filtration module 20. In case of a crossflow filtration module, both the retentate and the permeate exit the filtration module 20 via separate output connectors (not shown).

In addition, the filtration module 20 includes a separate sampling flow path 16. The sampling flow path 16 is formed here as a single channel leading through the filtration module 20 and terminates into an inlet connector 24 and an outlet connector 26, respectively. A transport medium (buffer or solvent) can be urged continuously or intermittently (in a stopped-flow manner) through the sampling flow path 16.

Figures 2A, 2B, 2C, 2D, 2E, 2F, 2G:
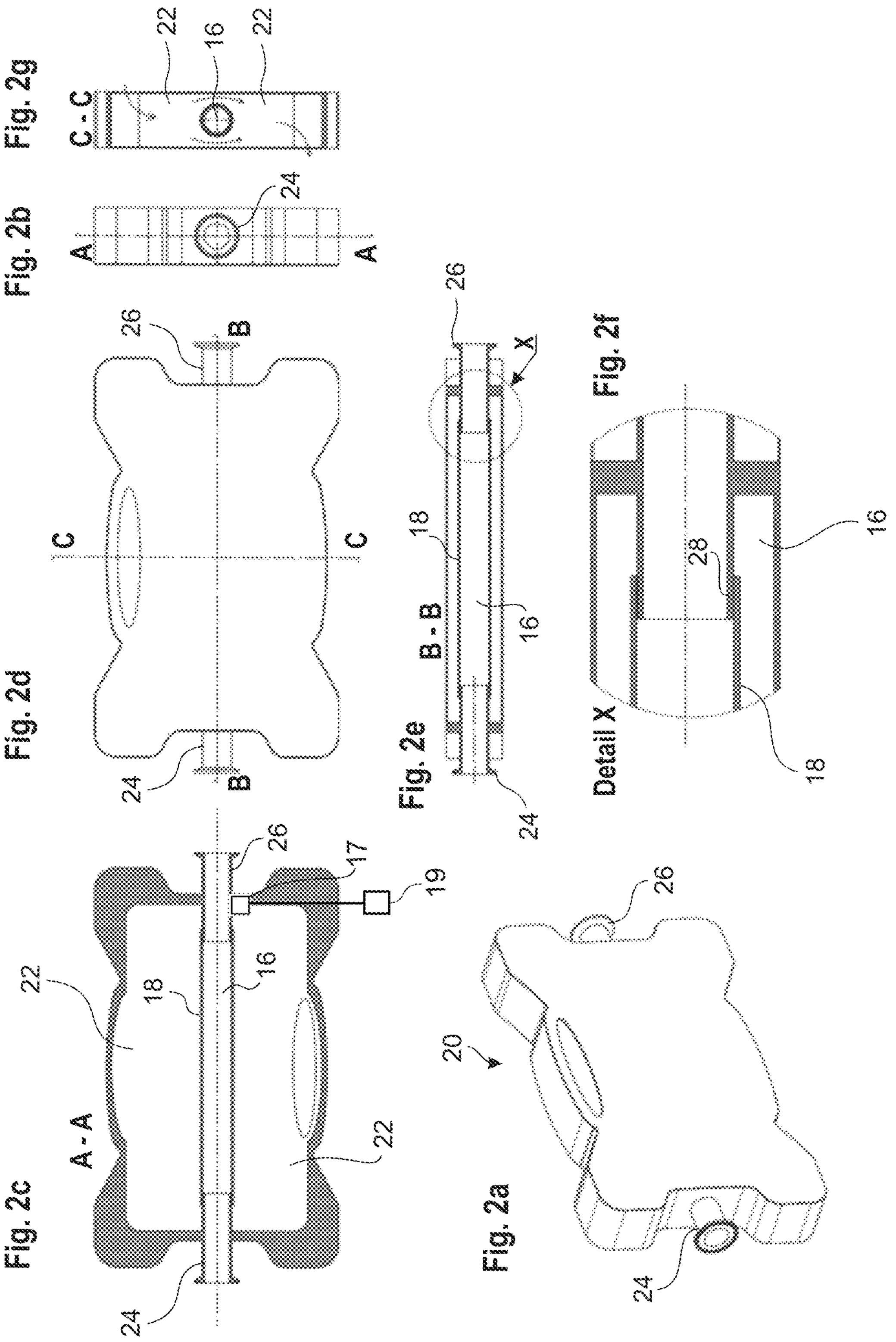
FIG. 2*a* shows a perspective view of a first embodiment of a filtration module according to the invention.
FIG. 2*b* shows a view of a first side of the filtration module according to FIG. 2*a;*
FIG. 2*c* shows a section view of the filtration module according to FIG. 2*b* along sectional plane A-A.
FIG. 2*d* shows a view of a second side of the filtration module according to FIG. 2*a;*
FIG. 2*e* shows a section view of the filtration module according to FIG. 2*d* along sectional plane B-B.
FIG. 2*f* shows an enlarged view of detail X according to FIG. 2*e;*
FIG. 2*g* shows a section view of the filtration module according to FIG. 2*d* along sectional plane C-C.
Figures 3A, 3B, 3C, 3D, 3E, 3F:
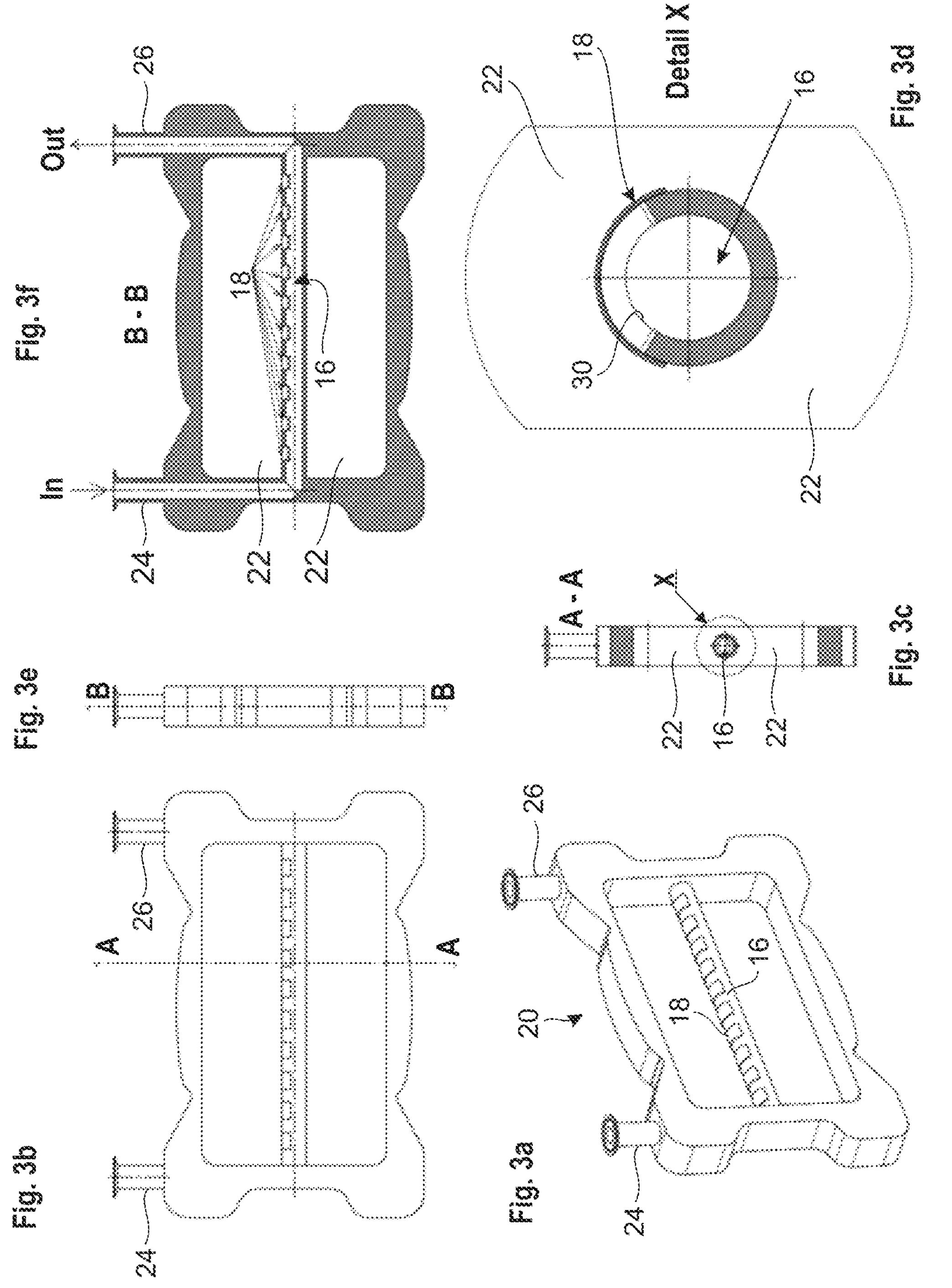
FIG. 3*a* shows a perspective view of a second embodiment of a filtration module according to the invention.
FIG. 3*b* shows a view of a first side of the filtration module according to FIG. 3*a;*
FIG. 3*c* shows a section view of the filtration module according to FIG. 3*b* along sectional plane A-A.
FIG. 3*d* shows an enlarged view of detail X according to FIG. 3*c;*
FIG. 3*e* shows a view of a second side of the filtration module according to FIG. 3*a;*
FIG. 3*f* shows a section view of the filtration module according to FIG. 3*e* along sectional plane B-B FIG. 4 schematically shows a multi-channel sampling flow path with two different sampling membranes.

As can be seen in FIGS. 2*c*, 2*e* and 2*f*, a portion of the sampling flow path 16 is formed by a cylindrical sampling membrane 18. The axial ends of the sampling membrane 18 are pushed on corresponding inner end portions 28 of the inlet and outlet connectors 24, 26, respectively. Thus, the sample membrane 18 forms a portion of a boundary between the process medium and the sampling flow path 16.

The actual shape and arrangement of the sampling membrane 18 may vary. In any event, the sampling membrane 18 should be coupled both to the process flow path and to the sampling flow path 16 such that selected molecules of the process medium can travel across the sampling membrane 18 into the sampling flow path 16 and form a sample.

The transport medium in the sampling flow path 16 receives the molecules from the process medium and transports the sample to an analyzer 17. The analyzer 17 is either integrated into the filtration module 20 or provided as a separate external component of a filtration assembly. In the latter case, the sample is transported via the outlet connector 26 to the external analyzer.

The integrated or external analyzer can be based on at least one of the following techniques: liquid chromatography (LC); liquid chromatography-mass spectrometry (LC-MS); high-performance liquid chromatography (HPLC); ultra-high-performance liquid chromatography (UHPLC); gas chromatography (GC); gas chromatography-mass spectrometry (GC-MS); matrix-assisted laser desorption/ionization combined with time-of-flight mass spectrometry (MALDI-TOF); enzymatic analysis; spectroscopic analysis, in particular at least one of the following: Raman spectroscopy, near-infrared spectroscopy (NIR), mid-infrared spectroscopy (MIR), ultraviolet-visible spectroscopy (UV-Vis), fluorescence spectroscopy; osmometry; pH measurement; conductivity measurement; optical measurement, in particular refractometry; surface plasmon resonance (SPR); nuclear magnetic resonance spectroscopy (NMR).

It is generally possible to take samples in the above-described manner from the feed and/or from the retentate and/or from the permeate. The respective sampling membrane 18 has to be coupled both to the respective flow path in the filtration module 20 (feed path, retentate path, permeate path), which is then regarded as part of the process flow path, and to the sampling flow path 16. It may be expedient to provide separate sampling flow paths 16 for each kind of sample (feed, retentate, permeate).

If different molecules are to be taken as separate samples, a corresponding number of sampling membranes 18 having different characteristics, especially with respect to pore size (MWCO), are provided.

Depending on the type of analysis, it may be possible to use a regular filter membrane as sampling membrane 18. Accordingly, the sampling membrane 18 allows a relatively large proportion of components of the process medium to permeate through the sampling membrane. In this case, a transport medium in the sampling flow path 16 is not absolutely necessary.

The connectors of the filtration module 20 are preferably tri-clamp flanges or hose barbs allowing sterile connections. Thus, the filtration module can be easily integrated into a filtration assembly used in a bioprocess. Since the complete filtration module 20 is designed as a single-use module, it can be disposed of as a whole after use and be replaced by a new filtration module 20 for the following application.

FIGS. 3*a* to 3*f* show a second embodiment of the filtration module 20. In the following, only the major differences compared to the first embodiment will be explained.

In the second embodiment the inlet and outlet connectors 24, 26 are arranged at another side of the filtration module 20, while the sampling flow path 16 is still in direct contact with the process medium. Here, a plurality of sampling membranes 18 are disposed along the sampling flow path 16, each sampling membrane 18 forming a portion of the boundary between the process medium and the sampling flow path 16. In particular, as can be seen in the sectional view of FIG. 3*d*, the sampling flow path 16 is formed as a single channel with a plurality of openings 30. Each of the openings 30 is covered by a sampling membrane 18. As explained above, the sampling membranes 18 may have different characteristics, especially regarding pore size.

It is to be understood that the embodiments shown in the Figures are only used to illustrate certain features of the filtration module 20, which may be combined in any suitable manner. Moreover, the sampling membranes 18 may have other shapes, especially in case the filtration module 20 is not configured as a cartridge but as a capsule, for example.

Especially in cases where it is useful to enrich the analyte before an analysis, a capture membrane can be used as sampling membrane 18. The capture membrane is specifically configured to capture the analyte from the process medium flowing through the process flow path. To this end, the surface of the capture membrane is provided with a specific binding material adapted to the analyte. The accumulated analyte is extracted from the capture membrane by elution on the other side of the membrane, i.e. a solvent is urged through the sampling flow path 16 for washing out the analyte. The solvent is also used as transport medium for guiding the extracted sample to a sampling outlet of the filtration module 20 or to an analyzer 17 integrated into the filtration module 20.

According to another approach, the sampling membrane 18 is a hydrophilic membrane exhibiting an affinity for water. In general, hydrophilic membranes are capable of filtering such elements as bacteria, viruses, proteins, particulates, and other contaminants. Likewise, it is possible to use a hydrophobic membrane which blocks the passage of water. The choice between a hydrophilic membrane and a hydrophobic membrane depends on the kind of the analyte.

Irrespective of the general design of the filtration module 20, the process flow path and/or the sampling flow path 16 may be composed of multiple separate channels.

Figure 4:
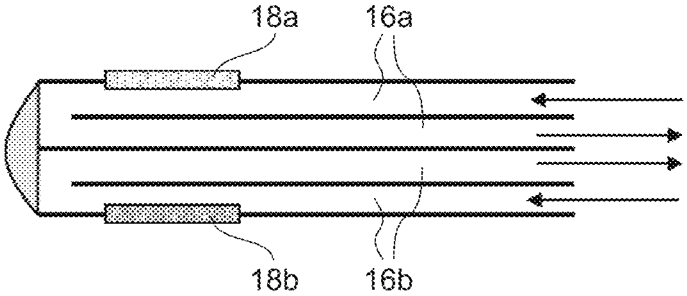
Figure 5:
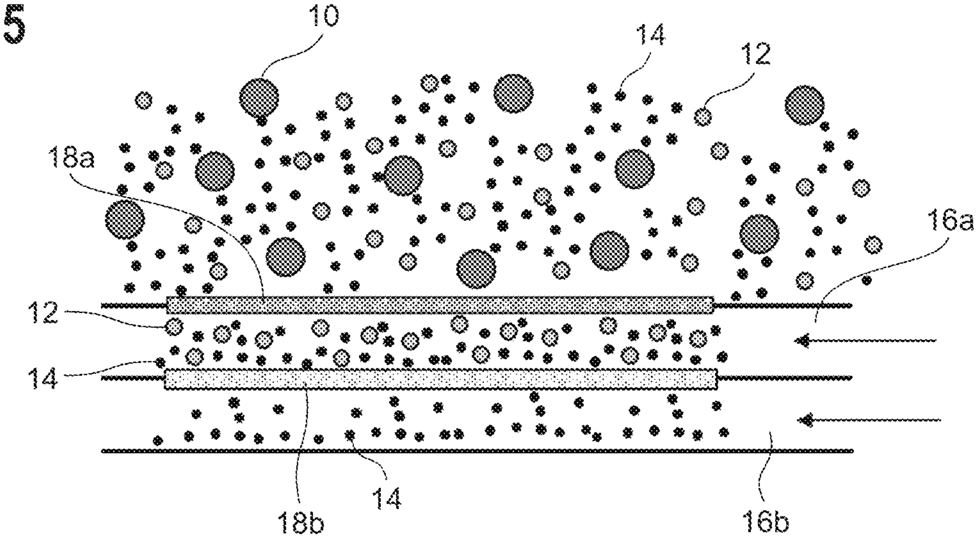
FIG. 5 schematically shows a sampling technique using two different sampling membranes in a cascade arrangement.

FIGS. 4 and 5 show two schematic examples of a multi-channel sampling flow path 16 with two individual sampling flow channels 16*a*, 16*b*. Each of the sampling flow channels 16*a*, 16*b* is provided with a sampling membrane 18*a*, 18*b*, respectively. The sampling membranes 18*a*, 18*b* may have different characteristics (e.g. MWCO). A transport medium is urged through each sampling flow channel 16*a*, 16*b* individually. Thus, the different samples contained in the different sampling flow channels 16*a*, 16*b* can be taken to the same analyzer sequentially (one after the other with breaks in between) or to different analyzers (possibly simultaneously).

In the embodiment shown in FIG. 4 each sampling membrane 18*a*, 18*b* is coupled both to the process flow path and to its associated sampling flow channel 16*a*, 16*b*, respectively.

In the embodiment shown in FIG. 5, however, only the first sampling membrane 18*a* of the first sampling flow channel 16*a* is coupled to the process flow path, i.e. the second sampling membrane 18*b* is not coupled to the process flow path. Instead, the second sampling membrane 18*b* coupled both to the first sampling flow channel 16*a* and to the second sampling flow channel 16*b*.

It is especially expedient if the first sampling membrane 18*a* has a larger MWCO (pore size) than the second sampling membrane 18*b* as shown in FIG. 5. With such a cascade arrangement of sampling membranes 18*a*, 18*b* it is possible to provide MWCO dependent transport of analytes to the same analyzer or to different analyzers.

Of course, the cascade arrangement of sampling membranes can be further extended with additional sampling flow channels and sampling membranes interconnecting the individual sampling flow channels.

A computer program executable on a general-purpose computer can be used to perform or assist performance of any of the method steps described above. In particular, the computer can be configured as a process control unit 19 (see FIG. 2*c*) of the filtration assembly which is adapted to adjust or to control process components of the bioprocess.

LIST OF REFERENCE SIGNS

8 process flow path
10 cells
12 proteins and/or antibodies
14 smaller molecules
16 sampling flow path
16*a* first sampling flow channel
16*b* second sampling flow channel
17 analyzer
19 process control unit
18*a* first sampling membrane
18*b* second sampling membrane
18 sampling membrane(s)
20 filtration module
22 filter membranes
24 inlet connector
26 outlet connector
28 end portions
30 openings

The invention claimed is:

1. A filtration module for filtering a process medium in a bioprocess, the filtration module comprising:
- a process flow path through which a process medium is urged during a filtering process step of the bioprocess,
- a filter membrane coupled to the process flow path for performing the filtering process of the bioprocess, and
- a sampling membrane coupled both to the process flow path and to a sampling flow path for extracting a sample from the process medium during the filtering process step,
- the sampling flow path guiding the extracted sample to a sampling outlet of the filtration module or to an analyzer integrated in the filtration module,
- wherein the filtration module is a cartridge, a cassette, a capsule, or a membrane absorber,
- wherein at least one further sampling membrane is coupled both to the process flow path and to the sampling flow path, the sampling membranes having different characteristics, including different pore sizes, and
- wherein the individual sampling membranes are coupled to different sampling flow channels of the sampling flow path.

2. The filtration module according to claim 1, characterized in that the sampling membrane forms at least a portion of a boundary between the process medium and the sampling flow path.

3. The filtration module according to claim 1, characterized in that the sampling membrane has a pore size which is smaller than the pore size of the filter membrane.

4. The filtration module according to claim 1, characterized in that the individual sampling membranes are coupled to different process channels of the process flow path.

5. The filtration module according to claim 1, characterized in that the sampling membrane is a hollow fiber arranged as a channel in the process flow path.

6. The filtration module according to claim 1, characterized in that the sampling membrane is a capture membrane comprising a binding material on a surface of the capture membrane to capture an analyte from the process medium flowing through the process flow path.

7. The filtration module according to claim 1, characterized in that the sampling membrane is a hydrophilic membrane or a hydrophobic membrane.

8. The filtration module according to claim 1, characterized in that the analyzer is based on at least one of the following techniques: liquid chromatography; liquid chromatography-mass spectrometry; high-performance liquid chromatography; ultra-high-performance liquid chromatography; gas chromatography; gas chromatography-mass spectrometry; matrix-assisted laser desorption/ionization combined with time-of-flight mass spectrometry; enzymatic analysis; spectroscopic analysis; Raman spectroscopy, near-infrared spectroscopy, mid-infrared spectroscopy, ultraviolet-visible spectroscopy, fluorescence spectroscopy; osmometry; pH measurement; conductivity measurement; refractometry; surface plasmon resonance; nuclear magnetic resonance spectroscopy.

9. A filtration assembly for filtering a process medium in a bioprocess, the filtration assembly comprising the filtration module according to claim 1 and an analyzer coupled to the sampling outlet of the filtration module.

10. The filtration assembly according to claim 9, characterized in that the analyzer is based on at least one of the following techniques: liquid chromatography; liquid chromatography-mass spectrometry; high-performance liquid chromatography; ultra-high-performance liquid chromatography; gas chromatography; gas chromatography-mass spectrometry; matrix-assisted laser desorption/ionization combined with time-of-flight mass spectrometry; enzymatic analysis; spectroscopic analysis; Raman spectroscopy, near-infrared spectroscopy, mid-infrared spectroscopy, ultraviolet-visible spectroscopy, fluorescence spectroscopy; osmometry; pH measurement; conductivity measurement; refractometry; surface plasmon resonance; nuclear magnetic resonance spectroscopy.

11. The filtration assembly according to claim 9, characterized by means for urging a transport medium through the sampling flow path.

12. The filtration assembly according to claim 9, comprising a process control unit configured to receive data from the analyzer and adjust or control process the bioprocess.

13. A method of sampling during the bioprocess, the method comprising the following steps:
- providing the filtration module according to claim 1;
- urging the process medium through the process flow path;

filtering the process medium by using the filter membrane coupled to the process flow path;

extracting the sample from the process medium during the filtering by using the sampling membrane coupled to both the process flow path and the sampling flow path; and guiding the extracted sample to the sampling outlet of the filtration module or to the analyzer integrated into the filtration module.

14. A computer program comprising instructions to cause the means for urging the transport medium through the sampling flow path of the filtration assembly according to claim 11 to control the flow of the transport medium.

15. A computer program comprising instructions to control the analyzer of the filtration module according to claim 1 to provide settings and inputs to the analyzer.

16. A computer program comprising instructions to control the analyzer of the filtration assembly according to claim 9 to provide settings and inputs to the analyzer.

17. A computer program comprising instructions to cause a process control unit of the filtration assembly according to claim 9 to evaluate analysis data provided by the analyzer of the filtration module or the analyzer of the filtration assembly, and to adjust or control the bioprocess based on the evaluation.

* * * * *